(12) United States Patent
Freeman

(10) Patent No.: US 6,621,548 B2
(45) Date of Patent: Sep. 16, 2003

(54) ELECTROOPTICAL DISPLAYS CONSTRUCTED WITH POLYMER-COATED ELEMENTS POSITIONED BETWEEN SUBSTRATES

(75) Inventor: Gary A. Freeman, Newton, MA (US)

(73) Assignee: Viztec, Inc., Tampa, FL (US)

( * ) Notice: Subject to any disclaimer, the term of this patent is extended or adjusted under 35 U.S.C. 154(b) by 220 days.

(21) Appl. No.: 09/882,311

(22) Filed: Jun. 15, 2001

(65) Prior Publication Data

US 2003/0002006 A1 Jan. 2, 2003

(51) Int. Cl.7 ............................................. G02F 1/1333
(52) U.S. Cl. ...................................... 349/155; 349/187
(58) Field of Search ............................... 349/155, 156, 349/187, 190

(56) References Cited

U.S. PATENT DOCUMENTS

| | | | |
|---|---|---|---|
| 4,001,140 A | 1/1977 | Foris et al. | 252/316 |
| 4,249,800 A | 2/1981 | Spruijt | |
| 4,331,795 A | 5/1982 | Ukita et al. | 526/273 |
| 4,678,284 A | 7/1987 | Tashiro | 350/344 |
| 4,688,900 A | 8/1987 | Doane et al. | 350/347 V |
| 5,130,831 A * | 7/1992 | Kohara et al. | 349/155 |
| 5,285,304 A | 2/1994 | Hotta et al. | |
| 5,321,533 A | 6/1994 | Kumar | 359/51 |
| 5,327,271 A | 7/1994 | Takeuchi et al. | 359/75 |
| 5,333,074 A | 7/1994 | Hikmet | 359/51 |
| 5,389,288 A | 2/1995 | Rindo et al. | |
| 5,434,685 A | 7/1995 | Pirs et al. | 359/51 |
| 5,473,450 A | 12/1995 | Yamada et al. | 359/51 |
| 5,474,629 A | 12/1995 | Yamazaki et al. | |
| 5,486,941 A * | 1/1996 | Saiuchi et al. | 349/155 |
| 5,503,932 A * | 4/1996 | Sakai et al. | 428/404 |
| 5,504,600 A | 4/1996 | Pirs et al. | 359/51 |
| 5,530,566 A | 6/1996 | Kumar | 359/51 |
| 5,530,567 A * | 6/1996 | Takei | 349/86 |
| 5,581,384 A | 12/1996 | Hotta et al. | 349/155 |
| 5,583,672 A | 12/1996 | Kim | 349/92 |
| 5,612,803 A | 3/1997 | Yamada et al. | 349/188 |
| 5,670,257 A | 9/1997 | Sakai et al. | |
| 5,729,312 A | 3/1998 | Yamagishi et al. | 349/86 |
| 5,739,882 A | 4/1998 | Shimizu et al. | |
| 5,812,232 A | 9/1998 | Shiroto et al. | 349/157 |
| 5,940,156 A | 8/1999 | Nishiguchi et al. | 349/156 |
| 5,949,508 A | 9/1999 | Kumar et al. | 349/122 |
| 6,004,423 A | 12/1999 | Ruedin et al. | 156/292 |
| 6,019,284 A | 2/2000 | Freeman et al. | 235/380 |
| 6,049,366 A | 4/2000 | Hakemi et al. | 349/86 |
| 6,064,461 A * | 5/2000 | Nishida | 349/155 |
| 6,078,378 A | 6/2000 | Lu et al. | 349/155 |
| 6,128,056 A | 10/2000 | Kubota et al. | 349/86 |
| 6,226,067 B1 | 5/2001 | Nishiguchi et al. | |

FOREIGN PATENT DOCUMENTS

| | | | | |
|---|---|---|---|---|
| JP | 05264969 A | * | 10/1993 | G02F/1/1333 |
| JP | 2000169591 A | * | 6/2000 | C08J/3/12 |

* cited by examiner

*Primary Examiner*—Kenneth Parker
(74) *Attorney, Agent, or Firm*—Fish & Richardson P.C.

(57) ABSTRACT

There is disclosed a liquid crystal display device comprising two substrates facing and spaced from each other, at least one of the substrates being transparent, electrodes positioned to establish an electric field in the space between the two substrates, one or more spacer elements located between the substrates, the spacer elements having been introduced between the substrates during assembly of the device, an electrooptic material filling at least a portion of the space between the two substrates, and a polymeric material filling at least a portion of the space between the substrates, the polymeric material comprising a liquid prepolymeric material that was applied to the spacer elements in liquid form and having been polymerized in situ after the spacer elements were in place between the substrate.

78 Claims, 3 Drawing Sheets

ELECTROOPTICAL DISPLAYS CONSTRUCTED WITH POLYMER-COATED ELEMENTS POSITIONED BETWEEN SUBSTRATES

BACKGROUND OF THE INVENTION

This invention relates to liquid crystal and other electronic displays.

Commercially, it is highly desirable for an electronic display to be as thin and light as possible while still maintaining a high degree of ruggedness and imperviousness to forces that are a consequence of shock and drop. In the area of mobile electronics, such as cell phones and personal digital assistants (PDAs), size and weight are critical factors to the commercial success of a product, but currently breakage of the displays within these devices remains the primary cause of repairs and product returns. In addition, the need for electronic displays that can actually be bent has been acknowledged in several areas: so-called 'electronic paper' in which fiber paper is replaced with a display would be much more compelling as a product if the electronic display could be rolled up or folded like traditional paper; wearable electronics such as computers or multifunction watches would be much more comfortable to the wearer if the display were to conform to the user's body; chip cards which have strict flexure life-test performance standards would be able to incorporate flexible displays and still conform to those standards. Replacement of the glass substrates within displays with plastic film has been an area of active research within the display community for a number of years.

Electrophoretic displays achieve images via electrophoretics—the rapid migration of microparticles in colloidal suspensions. Light scattering particles are moved within a dyed colloidal suspension by electrostatic forces. The particles will either move toward the viewer, in which case, the typically white particles are seen by the viewer, or to the surface away from the viewer, in which case, the white particles will be hidden by the dark dye.

Cholesteric displays are another display technology being attempted on plastic substrates. When sandwiched between conducting electrodes, cholesteric liquid-crystal material can be switched between two stable states—the so-called focal conic and planar states—in which the liquid crystal's helical structures have different orientations. In the focal conic state, the helical structures are unaligned and the liquid crystal is transparent. In the planar state, the helical structures' axes are all perpendicular to the display's surface resulting in essentially monochromatic transmission by the display.

The Gyricon display being developed by Xerox, is made of microscopic beads, randomly dispersed and held in place between two plastic sheets by a flexible elastomeric matrix of oil-filled cavities. The balls have strongly contrasting hemispheres, black on one side and white on the other. The white side is highly reflective, while the black side absorbs light. Each hemisphere has a unique intrinsic charge, resulting in a force on the ball when an electric field is applied and the axis of the ball isn't aligned with the field. The side of the ball presented for display depends on the polarity of the voltage applied to the electrode. In all three of these cases, while they have some positive features such as high contrast and compatibility with plastic substrates, they all currently high drive voltages, have slow response times, and are not compatible with commercially available drive electronics.

Liquid crystal displays (LCDs) are attractive because of the low drive voltages required to switch them, their relatively fast response times, the wide availability of drive electronics, and the significant intellectual and manufacturing investment in the technology. Attempts have been made to develop LCDs that intermixed the liquid crystal within a polymer matrix in order to make them compatible with plastic substrates, one example being polymer dispersed displays (PDLCDs). PDLCDs are fabricated by intermixing the liquid crystal and a prepolymer into a solution prior to assembling the display. After assembling the display, the polymer is cured, typically by ultraviolet light. During the polymerization the LC separates out from the polymer into microscopic droplets. Since the droplets of LC are not in contact with any alignment layer, the orientation of the molecules is random and light is scattered by the droplets. Applying a voltage to the electrodes of the PDLCD causes the LC molecules to become aligned, resulting in the display becoming transparent. Like the other flexible displays, PDLCDs required high drive voltages not generally compatible with existing drive electronics. Prior art such as U.S. Pat. Nos. 4,688,900, 5,321,533, 5,327,271, 5,434,685, 5,504,600, 5,530,566, 5,583,672, 5,949,508, 5,333,074, and 5,473,450 all make use of phase separation of an LC/polymer mixture during polymerization of the polymer using light as the curing mechanism (photopolymerization).

Methods have been developed to achieve anisotropically dispersed LC/polymer structures which might have drive voltages lower then those achieved in PDLCDs. U.S. Pat. No. 5,949,508 describes a method in which a lamellar structure is achieved whereby the LC and polymer are disposed on opposite substrates; this reduces the drive voltages necessary to switch the device, but results in a structure where it is only practical to have the rubbed alignment surface on one of the substrates. While this structure is effective with nematic or electrically controlled birefringence (ECB) displays, it becomes more difficult to construct displays such as twisted nematic (TN) and super twisted nematic (STN) which typically require alignment surfaces on both substrates. U.S. Pat. Nos. 5,473,450 and 5,333,074 describe methods of localizing the polymer during photopolymerization by exposing only portions of the device to the light source using masks. Polymer structures of a size on the order of a pixel (~0.3 mm) are achievable, but manufacturing may be more difficult since the photomask must generally be aligned to the electrode structure within the device and expensive collimated UV light sources must generally be employed. Structures much smaller than 0.3 mm may be difficult to achieve due to the inherent scattering of the LC/polymer mixture. U.S. Pat. No. 5,473,450 teaches the patterning of photoinitiator onto the alignment layer, but this method generally requires a highly accurate, screened deposition of the chemical photoinitiator onto the substrates. Proper alignment of the silk-screening mask to the clear ITO electrodes may be difficult to achieve, and the introduction of chemicals directly onto the polyimide alignment surface may result in poor alignment of the LC to the alignment surface, poor appearance of the display and lower manufacturing yields.

Other methods have been developed for providing adhesion between plastic substrates involving adhesive elements. In one method, a thermoset (e.g., epoxy) or thermoplastic (e.g., hot melt) adhesive as a solid coating around the spacer elements (U.S. Pat. Nos. 4,678,284, 5,130,831). Heat and pressure are applied after the coated spacers are in place between the substrates. Other methods use solid adhesive elements separate from the spacer elements (U.S. Pat. Nos. 5,812,232, 5,581,384, 6,004,423).

In addition to the breakage problems due to shock and drop, glass substrate displays also have difficulty surviving extremes of temperature. When the temperature of a display is cycled between cold and hot it will sometimes develop small voids between the spacers and the liquid crystal fluid. While the voids are small in size, they typically are noticeable enough that the display will be returned for repair. The voids are due to the mismatch in the thermal coefficients of expansion between the LC and the typically glass or plastic spacers. When a glass substrate display is assembled at room temperature and then sealed, its volume is essentially fixed at that point. As the display is cooled down, both the LC and spacer material will contract but due to the mismatch in the thermal coefficients of expansion and the mechanical discontinuity at the spacers, stress is localized around the spacers and voids develop. Initially, the voids are small areas of vacuum or very low pressure, but the more volatile components of the LC quickly move to a gaseous phase to fill the void to achieve a lower energy equilibrium state. When the display is returned to room temperature, the vapor filling the voids prevents the voids from being absorbed back into the LC, and the damage is typically permanent. Display manufactures have solved this problem by, amongst other methods, utilizing specially fabricated spacers that have a softer, more compliant exterior coating surrounding a core of either glass or plastic. The outer compliant layer acts to relieve the stresses encountered during thermal cycling of the display, thus preventing the voids. Because of the difficulty of manufacturing these spacers, they are often 10–20 times more expensive than regular spacers and so are often used only when absolutely necessary.

SUMMARY OF THE INVENTION

In general, in a first aspect, the invention features a liquid crystal display device comprising two substrates facing and spaced from each other, at least one of the substrates being transparent, electrodes positioned to establish an electric field in the space between the two substrates, one or more spacer elements located between the substrates, the spacer elements having been introduced between the substrates during assembly of the device, an electrooptic material filling at least a portion of the space between the two substrates, and a polymeric material filling at least a portion of the space between the substrates, the polymeric material comprising a liquid prepolymeric material that was applied to the spacer elements in liquid form and having been polymerized in situ after the spacer elements were in place between the substrate.

In general, in a second aspect, the invention features manufacturing a liquid crystal display device by introducing spacer elements between two substrates that face each other, at least one of the substrates being transparent, applying a liquid prepolymeric material to the exterior surfaces of one or more spacer elements before or after introduction of the spacer elements between the substrates, positioning electrodes to establish an electric field in the space between the two substrates, filling at least a portion of the space between the two substrates with an electro-optic material, and polymerizing the liquid prepolymeric material in situ to form solid polymeric material filling at least a portion of the space between the substrates.

In preferred implementations, one or more of the following features may be incorporated. The polymeric material may be in the vicinity of the spacer elements. The liquid prepolymeric material may be applied to the spacer elements prior to their introduction between the substrates. The liquid prepolymeric material may be applied to the spacer elements after their introduction between the substrates. The liquid prepolymeric material may be encased in a collapsible shell surrounding at least some of the spacer elements. The prepolymeric material can constitute one or more of the following materials: monomers (e.g., basic polymer chain material), oligomers (e.g., for cross linking), inhibitors (e.g., to prevent polymerization during storage), adhesion promoters, and polymerization initiating or enhancing (PIE) materials. The liquid prepolymeric material may have a viscosity equal to or less than 2,000,000 centipoise. A polymerization initiating or enhancing (PIE) material may be brought into contact with the liquid prepolymeric material. The PIE material may be brought into contact with the liquid prepolymeric material in one of the following ways: it is mixed with the liquid prepolymeric material applied to the spacer elements; it is carried on or within the spacer elements; it is dissolved or suspended in the electrooptic material. The liquid prepolymer material and the PIE material may both be encased in a collapsible shell surrounding at least some of the spacer elements. The polymerization in-situ may comprise initiating polymerization by application of light. The liquid prepolymeric material may be a thermoset material, and the polymerizing in situ may comprise the application of heat. The polymeric material may comprise polymer supports that extend between the two substrates. The polymeric material may comprise polymer members that do not extend between the two substrates. Additional spacer elements without prepolymeric material may be introduced between the substrates. The spacer elements may comprise a large number of generally spherical or cylindrical elements. The spacer elements may comprise glass. The glass may be etched. The spacer elements may comprise plastic. The plastic may be porous. The spacer elements may comprise high-surface area particles that are nanoporous, mesoporous, or microporous. The spacer elements may be randomly located in the space between the substrates. The spacer elements may comprise a large number of elements generally of smaller diameter than the space between the substrates. The spacer elements may comprise a large number of elements randomly positioned across the space between the substrates. The spacer elements may generally not be in contact with the substrates. The spacer elements may be in contact with only one substrate. The spacer elements may comprise a lattice network structure. The lattice network structure may be two-dimensional. The lattice network structure may be three-dimensional. The spacer elements may be non-uniform in size and shape. The spacer elements may have a rough surface. Most of the spacer elements may be free to move around in the space between the substrates prior to polymerization. A porous membrane may serve as a spacer element. The porous membrane may be an extensible porous membrane. The spacer elements may be located in non-image areas of the substrate. The spacer elements may be located along the peripheries of the substrates and serve as one or more sealing members sealing the space between the substrates. The spacer elements may be located at interpixel regions. The prepolymer may contract upon in situ polymerization. The majority of the polymer supports may be bonded to each of the two substrates. The polymer supports may be primarily separate members not interconnected with one another. One or more interconnecting regions of polymer may interconnect a majority of the polymer supports. One of the interconnecting regions may comprise a layer of polymer adjacent one of the substrates. The spacer elements may be dry sprayed on to the substrate before application of the electrooptic material. The spacer elements may be wet sprayed on to the substrate. A solvent may be used for wet spraying comprises the prepolymeric material in solution or suspension. The PIE material may comprise one or both of the following: an initiator and an accelerant of the in situ polymerization process. The PIE material may be light activated. The PIE material may comprises a photoinitiator. The photoinitiator may comprise a plurality of photoinitiators of different spectral sensitivities, so that polymerization may be initiated at different times in different locations. The light may be ultraviolet light. The PIE material may be heat activated. The PIE material may be self-activated after a period of time following assembly of the display. The PIE material may comprise both a photoinitiator and an accelerant. The prepolymeric material may applied to the substrates by at least one of the following processes: pipette, syringe, or printing. The printing may comprise a silk screen, gravure, flexographic, or lithographic process. The spacer elements may be porous structures with a porous matrix, and the prepolymeric material may absorbed into the porous matrix of the porous structures. The porous structures may be nanoporous ceramic or silica based materials. The spacer elements may comprise an open network of polymer spheroids formed so that the electrooptic material fills interpolymer regions. The porosity of the porous structure may be selected to yield a desired adhesion of the spacer element to a polymer matrix comprising the in situ polymerized material. The electrooptic material may be a liquid crystal material. The electrooptic material may be a mesomorphic material. The invention may further comprise at least one electrode on at least one substrate to generate the electric field and at least one electrode on the second substrate. The prepolymeric material may comprises at least one of the following: acrylic-based adhesive, epoxy-based adhesive, urethane-based adhesive. The prepolymeric material may be primarily cured by application by one of the following: light, heat, intermixing of a chemical additive. The substrates may comprise a flexible polymer material. The display may be capable of withstanding the flexing text referenced in the detailed description.

Two important specifications that impact a plastic display's durability are its compressive and peel strength. In addition, when spacer elements are a single size and are in contact with both substrates in the assembled cell, it is often the case that the compressive strength is achieved with a lower spacer density than peel strength. It is therefore desirable to be able to independently improve a display's compression and peel strength while reducing contrast degradation. Spacer elements composed of the same material as the surrounding polymer provide the significant benefit of additional polymer interconnections between the substrates resulting in added peel strength but with relatively little impact on compressive strength. By adjusting the relative densities of the spacers and the polymer spacers and the durometer of the polymer spacers, improvements in compressive and peel strengths of the display device's laminate structure can be achieved.

Use of liquid adhesives provides a number of benefits over solid adhesives such as hot melts or thermoplastic adhesives. Liquid adhesives can achieve significantly better surface adhesion, elongation before break, and tensile strength, for instance, than solid adhesives; these performance parameters are all important factors determining how durable the adhesive bond will be.

Other features and advantages of the invention will be apparent from the following detailed description and from the claims, and from the disclosure and claims of my applications entitled "Electrooptical Displays with Polymer Localized in Vicinities of Substrate Spacers," U.S. Ser. No. 09/882,310; Electrooptical Displays Constructed with Polymerization Initiating and Enhancing Elements Positioned Between Substrates," U.S. Ser. No. 09/882,272; and "Electrooptical Displays with Multilayer Structure Achieved by Varying Rates of Polymerization and/or Phase Separation," U.S. Ser. No. 09/883,083, filed on even date herewith (and incorporated by reference).

DETAILED DESCRIPTION OF THE INVENTION

According to the present invention, in the preferred embodiment, a liquid crystal display device is assembled using the following procedure:

1. The substrates are a flexible polymer material with a low level of birefringence to improve the optical qualities of the final product and having a glass transition temperature greater than 150 degrees C in order to facilitate the various drying and baking operations. A polymer that meets these requirements is poly ether sulphone (PES). A vapor barrier is coated onto the outside surface of the substrate to improve the reliability and product life of the display; the vapor barrier is typically composed of a thin film laminate structure of silicon oxide and another polymer.
2. The substrates are coated with a vacuum-deposited layer of typically indium tin oxide (ITO), which is a transparent conductor. The ITO is then patterned via chemical, electron beam, or laser etching.
3. The prepolymer may be a commercially available photocured polymer such as Norland Product's NOA-65 or it may be a custom formulation such as the following:

| %     | Material            |
|-------|---------------------|
| 50    | Sartomer Co. SR 9644 |
| 15    | Sartomer Co. SR 306  |
| 18.5  | Sartomer Co. SR 256  |
| 1.25  | Stabilizer           |

-continued

| % | Material |
|---|---|
| 3 | Aceto Quantacure ITX |
| 5.5 | Tri ethanol amine (TEA) |
| 1.05 | 3M Corp. FC-430 |
| 1.6 | Dow Corning DC-57 |
| 1.6 | Wetting Agent |
| 2.5 | Fratelli Lamberti Escacure KIP |

Figure 1:
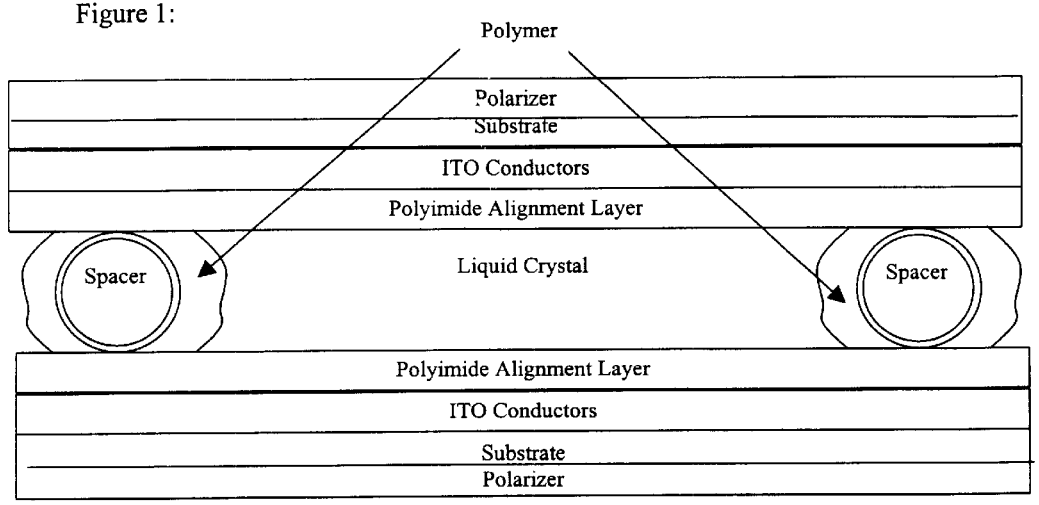
FIG. 1 shows a cross section of a liquid crystal display device that uses spherical spacers coated with a prepolymeric material after lamination prior to exposure to the developing light.

4. The prepolymer mixture is diluted in a solvent such as methanol at a ratio sufficient to achieve a viscosity of approximately 50 cps.
5. A polyimide solution is coated onto the ITO side of at least one of the substrates and baked at a temperature of 150 degrees C for one hour. The polyimide surface (s) are then rubbed to develop an alignment layer for the liquid crystal.
6. A liquid crystal such as Merck E7 is coated in a thin layer onto the polyimide surface. The exact quantity of liquid crystal is not critical since the thickness of the cell is determined by the spacer elements.
5. Glass spacers of a diameter of 3–3.5 µm are surface-etched using a 1.25% solution of hydrofluoric acid for 10 minutes while suspended in solution in an ultrasonic vibration tank. After washing, the etched spacers are then coated with a mixture of methacrylate silane and a photoinitiator by immersing the spacers into a solution containing the initiator and an adhesion promoter such as a silane and then spraying the spacers into the top of a vertical drying column onto the substrate(s). Silanes improve the bonding between glass and polymers via chemical bonding at the silane/glass interface and a dispersion of the polymer into the silane at the silane/polymer interface.
6. Spacers are mixed into the prepolymer solution in a concentration of approximately 1:1 wt/wt. The spacers are then dispersed into the prepolymer solution using ultrasonic mixing.
7. Using an aerosol spray system, the prepolymer/spacer mixture is then sprayed onto the uncoated substrate for a sufficient time to achieve a surface density of at least about 30 spacers/mm2 when the display has been assembled. The spacers tend to be distributed generally randomly across the substrate surface. Micro-filtered compressed nitrogen at approximately 10–30 psi is used as the propellant. The pressure, viscosity of the mixture, relative concentrations of spacers and prepolymer, as well as nozzle orifice shape are adjusted to achieve the prepolymer coating single spacers with some number of droplets containing prepolymer only. That substrate is then exposed to 120 degrees centigrade for 15 minutes to remove the solvents from the mixture.
8. The substrate with the prepolymer/spacer mix will typically undergo a pre-cure step to provide a tack to the polymer prior to the lamination step. If the prepolymer is curable by both heat and light, then the solvent bake step can be used as the pre-cure step as well.
9. The substrates are then laminated together while maintaining the proper alignment between the ITO patterns on the upper and lower substrates.
8. Both sides of the cell are then exposed to UV light that causes scission of the photoinitiator and release of free radicals around the spacers. The polymerization reaction will then proceed with the initiation sites centered around each spacer that was deposited with the initiator. FIG. 1 depicts a cross-sectional view of the display after step 8.

The resulting display is quite flexible. It can be flexed without permanent damage by at least the amount of flexing specified in the flexing tests described in U.S. Pat. No. 6,019,284, hereby incorporated by reference.

It is not necessary that polymer form in the vicinity of each spacer, nor that the polymer extend fully from one substrate to another in all cases. Some spacers, for example, may not have been coated with prepolymeric material, or they may have been imperfectly coated.

Polymer supports that do not extend fully from one substrate to the other may still be of benefit in creating isolated regions of liquid crystal, and thereby make possible improved bistability of certain ferroelectric liquid crystal materials, which may exhibit improved bistability if the liquid crystal layer is divided into discrete droplets along one substrate.

Figure 2:
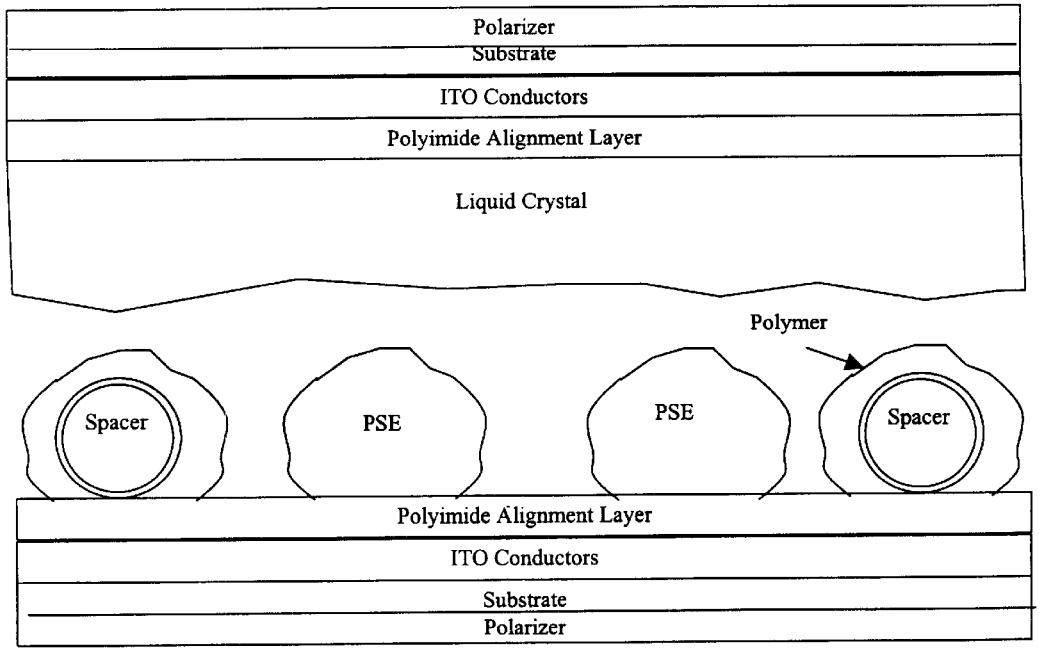
FIG. 2 shows a cross section of a liquid crystal display device that uses spherical spacers coated with a prepolymeric material including polymer spacer elements (PSEs) wherein the PSEs are applied prior to depositing the prepolymeric material. The view is shown just prior to lamination.
Figure 3:
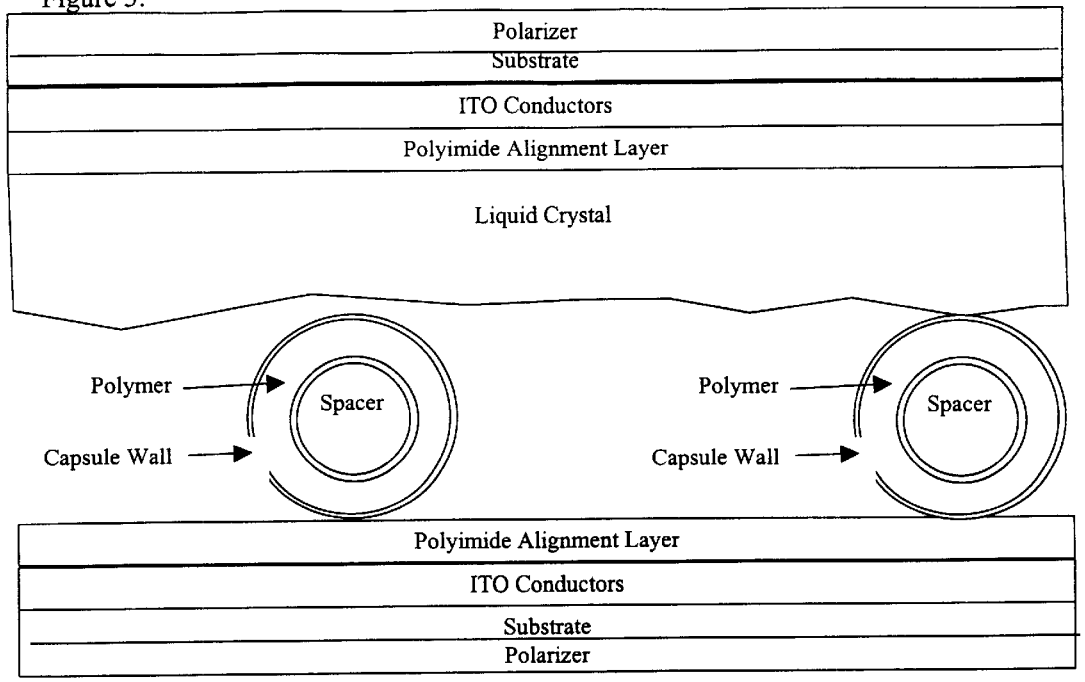
FIG. 3 shows a cross section of a liquid crystal display device that uses spherical spacers coated with a prepolymeric material including polymer spacer elements (PSEs) wherein the PSEs are applied after depositing the prepolymeric material.

In another embodiment, polymer spacer elements (PSEs) smaller than the predominant spacer element size that determines the substrate spacing can be added to the prepolymer/spacer mix. These PSEs are composed of a polymer formulated to typically achieve a transparency and an index of refraction that is the same as the polymer and liquid crystal to reduce dispersion. These polymer spacing elements can be produced by a number of methods and may even be formed at the time of their deposition onto the substrate via aerosol dispersion followed by heat the substrate, the prepolymer/spacer mix is deposited as before. Alternatively, the PSEs may be and ultraviolet cure of the polymer microspheres generated. Once the PSEs are deposited onto mixed with the prepolymer/spacer mix prior to its deposition onto the substrate. This embodiment allows for additional points of polymer contact between the substrates without any additional rigid spacer elements that can reduce the contrast of the display. This can be seen in FIG. 2.

In a separate process step, additional PSEs may be deposited. In this case, the aerosol conditions are adjusted so that the droplet size results in the tops of PSEs being slightly higher than the desired spacing between the substrates. Additionally, the PSEs are deposited onto the surface in a semi-cured state. Upon lamination, the prepolymer covered spacers are pushed through the liquid crystal layer and pressed against the opposing substrate as in the previously described embodiments; the semi-cured PSEs are also pushed through the liquid crystal layer and compressed by the opposing substrate. The PSEs may be composed of a polymer that, while having similar optical properties as the polymer coating the spacers, may have different mechanical properties, for instance, the PSE material may be formulated to shrink upon curing as well as having a value for its elongation before break parameter. In this way, the plastic substrates can actually be drawn together by a controlled amount subsequent to a full cure of the laminated cell. This will significantly enhance the flexure performance of the display as well as its overall durability.

In another embodiment, the spacers either individually or in small groups are encased in a collapsible shell that also contains a quantity of prepolymer. This can be achieved by a variety of well-known techniques classified generally as microencapsulation. Microencapsulation processes fall into several general categories, all of which can be applied to the present invention: interfacial polymerization, in situ polymerization, physical processes such as coextrusion, and coacervation. When the substrates are laminated together with the liquid crystal material and the polymer-coated spacer elements taking the form of the just-described encapsulated elements, the microcapsules are crushed during the lamination process releasing the prepolymer. As in other embodiments the spacers are pressed against both substrates during lamination, while the released prepolymer remains surrounding the spacer elements and is being brought into contact with the two substrates. The display is then exposed to ultraviolet light as before and the prepolymer is polymerized, resulting in the cured polymer bonding the spacer to both substrates.

While other microencapsulation techniques can be used to create microcapsules with the appropriate characteristics for this invention, two encapsulation techniques that are particularly well suited to the present invention are in-situ polymerization and interfacial polymerization.

The technique of in situ polymerization utilizes an oil/water emulsion, which is formed by dispersing the spacer/prepolymer mix in an aqueous environment. Prior to emulsifying the prepolymer in the aqueous phase, the spacers are mixed and fully dispersed into the prepolymer in a ratio of 1:2 wt/wt. The resulting prepolymer droplets due to emulsification will be 15–30 microns in diameter with less than 5 spacers contained within the droplet. A goal of the process is to create capsules with only one spacer per capsule. Tighter control of process parameters can achieve less deviation on droplet size which will minimize capsules with more than one spacer. By using a spacer composed of a material of different density than the prepolymer, e.g. glass, the number of capsules not containing one spacer can be minimized by sorting the finished capsules via such density-sorting methods as flotation or centrifuge. Monomers are introduced into the aqueous phase, polymerize, and form a polymer with higher affinity for the internal phase than for the aqueous phase, thus condensing around the emulsified oily droplets. In one especially useful in situ polymerization processes, urea and formaldehyde condense in the presence of poly (acrylic acid) (See, e.g., U.S. Pat. No. 4,001,140). The resulting capsule wall is a urea/formaldehyde copolymer, which encloses the spacer/prepolymer droplet. The capsule is clear and rigid. Transparency is important since the capsule shell will remain in the display after lamination; rigidity is an important feature of the capsule shell since an overly compliant shell material will result in the shell not crushing and properly releasing the prepolymer during lamination. Melamine-based shell materials also have the required qualities transparency and rigidity.

The electro-optic material used in the display can be any type of liquid crystal; for instance, the invention provides benefits to nematic, twisted nematic, super-twisted nematic, ferrolectric, anti-ferroelectric, cholesteric liquid crystal displays, to name a few. The invention also provides benefits to non-LCD displays. For instance, the durability of electrophoretic and Gyricon displays can be significantly enhanced by this method.

In another preferred embodiment, a liquid crystal display device is assembled using the following procedure:

1. The substrates are a flexible polymer material with a low level of birefringence to improve the optical qualities of the final product and having a glass transition temperature greater than 150 degrees C in order to facilitate the various drying and baking operations. A polymer that meets these requirements is poly ether sulphone (PES). A vapor barrier is coated onto the outside surface of the substrate to improve the reliability and product life of the display; the vapor barrier is typically composed of a thin film laminate structure of silicon oxide and another polymer.
2. The substrates are coated with a vacuum-deposited layer of typically indium tin oxide (ITO), which is a transparent conductor. The ITO is then patterned via chemical, electron beam, or laser etching.
3. The prepolymer may be a commercially available photocured polymer such as Norland Product's NOA-65 or it may be a custom formulation such as the following:

| %     | Material                       |
|-------|--------------------------------|
| 50    | Sartomer Co. SR 9644           |
| 15    | Sartomer Co. SR 306            |
| 18.5  | Sartomer Co. SR 256            |
| 1.25  | Stabilizer                     |
| 3     | Aceto Quantacure ITX           |
| 5.5   | Tri ethanol amine (TEA)        |
| 1.05  | 3M Corp. FC-430                |
| 1.6   | Dow Corning DC-57              |
| 1.6   | Wetting Agent                  |
| 2.5   | Fratelli Lamberti Escacure KIP |

Figure 4:
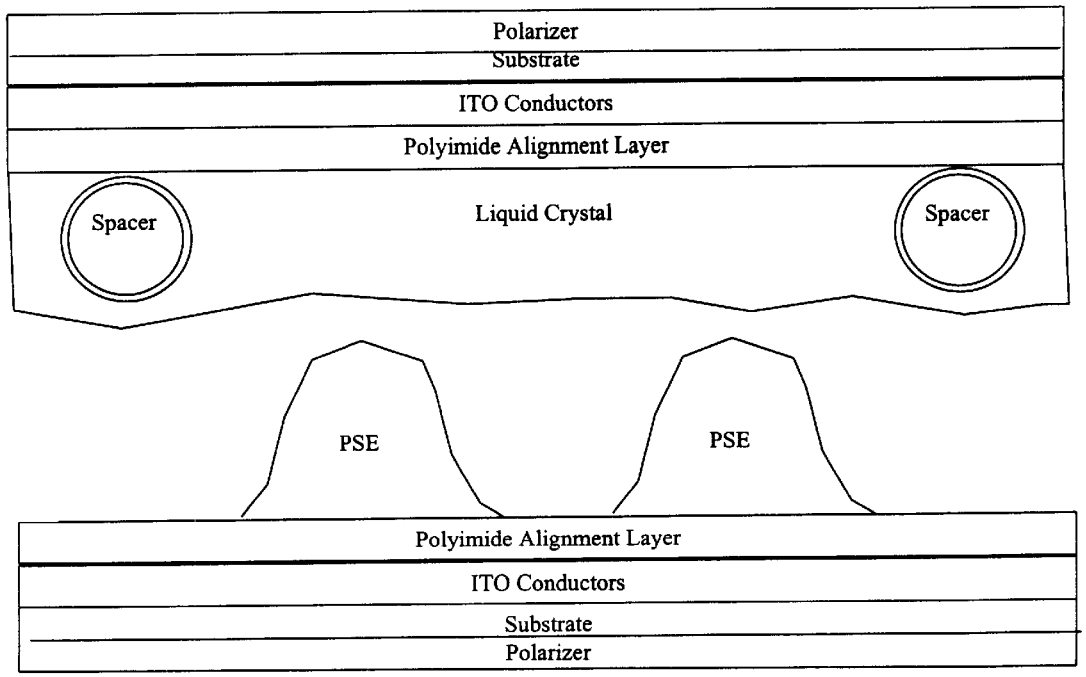
FIG. 4 shows a cross section of a liquid crystal display device that uses spherical spacers mixed into the liquid crystal with polymer spacer elements (PSEs) deposited onto the opposing substrate.
Figure 5:
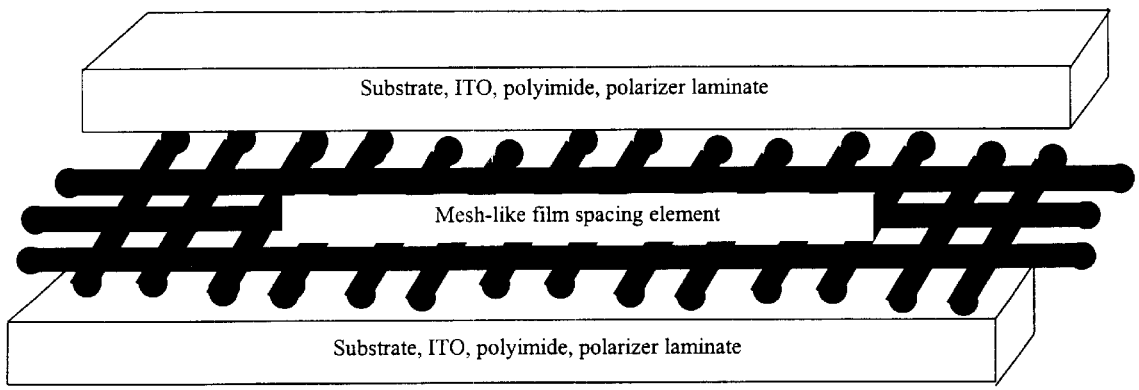
FIG. 5 shows a cross section of a liquid crystal display device that uses a mesh-like spacing membrane.
Figure 1:
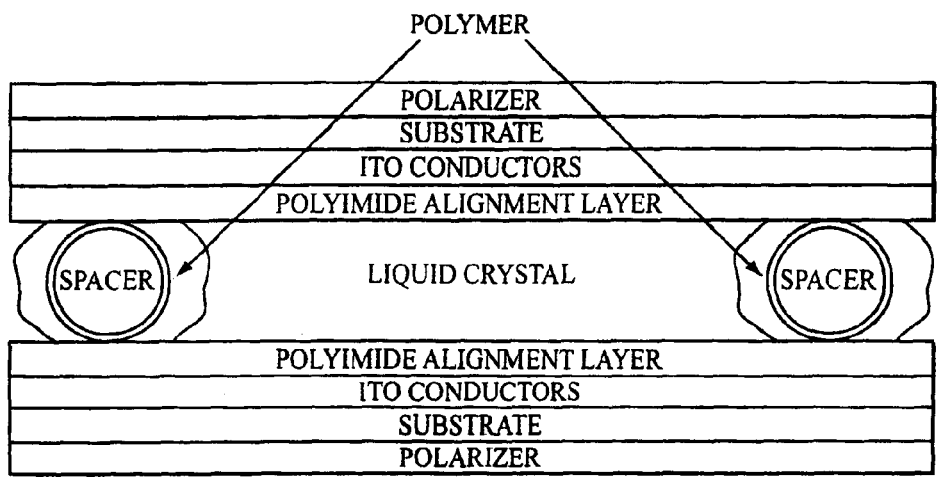
Figure 2:
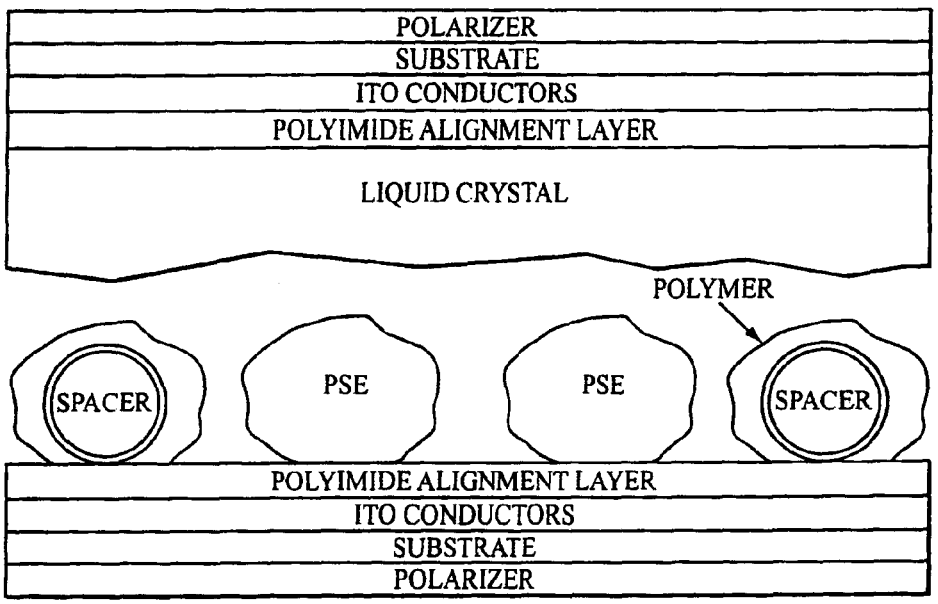
Figure 3:
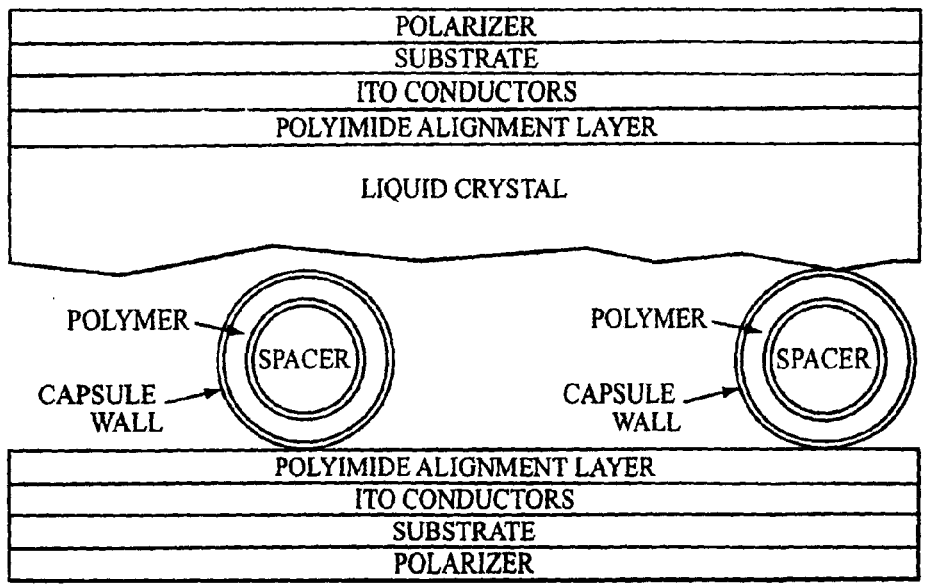
Figure 4:
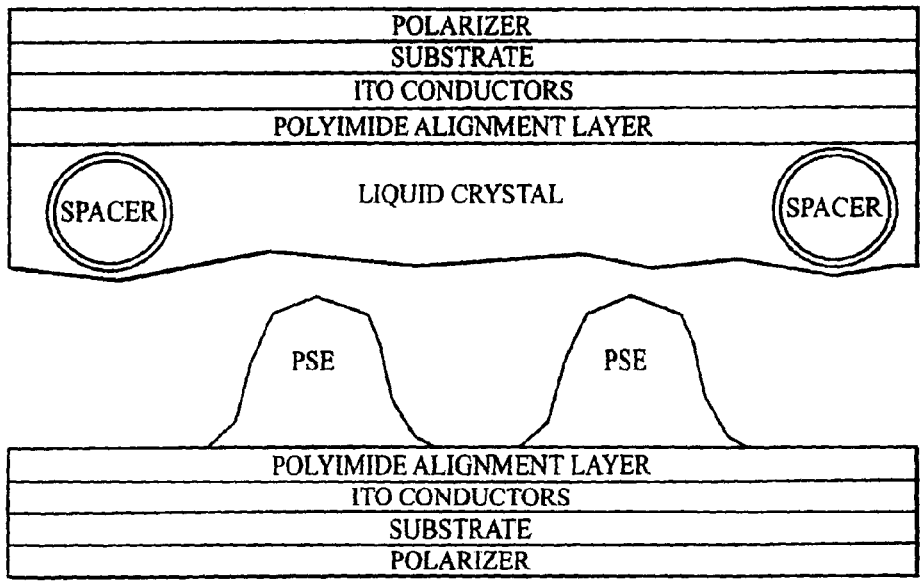
Figure 5:
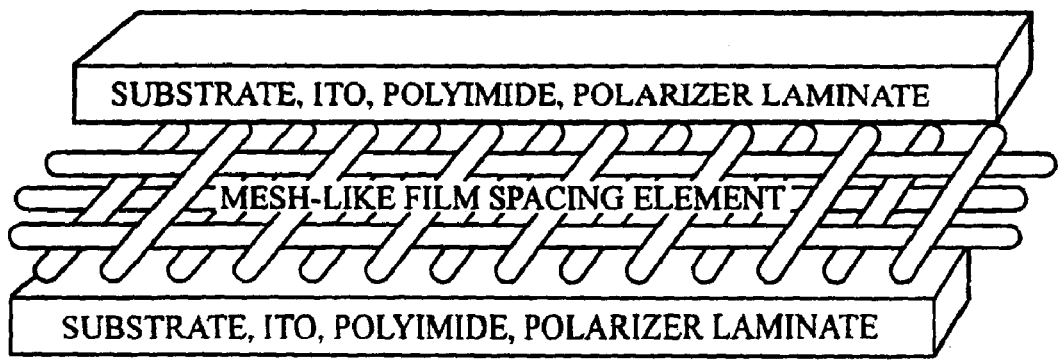

4. The prepolymer mixture is diluted in a solvent such as methanol at a ratio of 1:25 parts by weight.
5. A polyimide solution is coated onto the ITO side of at least one of the substrates and baked at a temperature of 150 degrees C for one hour. The polyimide surface(s) are then rubbed to develop an alignment layer for the liquid crystal.
6. Glass spacers of a diameter of 3–3.5 µm are used. The spacers are mixed into a liquid crystal such as Merck E7 in large numbers (with a density sufficient to produce a surface density of at least about 30 spacers/mm2 when the display has been assembled). The spacers tend to be distributed generally randomly across the substrate surface.
7. The liquid crystal/spacer mix is coated in a thin layer onto the polyimide surface. The exact quantity of liquid crystal is not critical since the thickness of the cell is determined by the spacer elements.
8. The PSEs are deposited onto the uncoated substrate via aerosol dispersion. The viscosity of the prepolymer formulation is adjusted and the prepolymer is diluted, as necessary, in a solvent in addition to adjusting the aerosol parameters to achieve particle sizes of the PSEs that are approximately 30% larger than the spacer diameter. That substrate is then exposed to 120 degrees centigrade for 15 minutes to remove the solvents from the mixture.
9. The substrate with the PSEs will typically undergo a pre-cure step to provide a tack to the polymer prior to the lamination step. If the prepolymer is curable by both heat and light, then the solvent bake step can be used as the pre-cure step as well.
10. The substrates are then laminated together while maintaining the proper alignment between the ITO patterns on the upper and lower substrates. FIG. 4 depicts the substrates just prior to lamination.
11. Both sides of the cell are then exposed to UV light that causes scission of the photoinitiator and release of free radicals around the spacers. The polymerization reaction will then proceed with the initiation sites centered around each PSE.

Two or more photoinitiators with different spectral sensitivities may be used to control when polymerization is initiated at a particular site. Since scission of the photoinitiator occurs when the photon energy of the light source exceeds a certain threshold, photoinitiators will typically be sensitive to light of wavelengths less than a specific value; thus, a photoinitiator sensitive to visible light will usually also be sensitive to ultraviolet light. One embodiment using this feature would be to coat the spacer elements with a UV sensitive photoinitiator and to have the prepolymer of the PSEs contain a visible light sensitive photoinitiator. The assembly is first exposed to visible light, resulting in the curing of only the PSEs, which, due to the shrinkage of the PSE polymer, draw the two substrates together. The assembly is then exposed to UV light, causing the polymer surrounding the spacers to be cured.

In another embodiment, other polymerization enhancing compounds such as adhesion promoters, or additives such as urethanes which improve elongation before tear properties are added to all, or some subset, of the PSEs. In such a way, peel strength can be further enhanced.

One possible polymer are acrylic adhesives which have excellent optical clarity as well as the availability of a wide selection of manufactured optical grade versions of the material. Other polymers that might also be used are, for instance, epoxies or urethanes, though typically these classes of polymers do not have the optical properties equal to those of the acrylics. Acrylic adhesives are reactive cross-linking structural adhesives that cure by means of free-radical initiation. They are based on the methacrylate monomers and cure by addition polymerization. The formation of free radicals initiates a sudden and rapid chain reaction and curing of the adhesive. Condensation polymerization, on the other hand, typified by urethane and epoxies, proceeds at an approximately constant, usually lower reaction rate. Generation of free radicals for initiation of polymerization of acrylic based adhesives can be accomplished by a redox reaction such as that involving dimethyl aniline and peroxide. Because of the nature of the chain reaction, the free radicals can propagate from monomer to monomer and the cure itself can propagate up to 2.5 mm from the point of polymerization initiation. As a result of this cure propagation phenomenon, the accelerator and monomer do not have to be fully intermixed to achieve a full cure. This leads to several other methods for curing, where the accelerator can be in the form of a lacquer or thin layer on one surface allowing for the priming and storing of parts. In another related cure method termed 'honeymoon' or 'no-mix' in industry parlance, a two part adhesive is used which when brought into contact with each other (without any intermixing necessary) will result in the generation of sufficient free radicals to fully polymerize all the material.

Acrylics can also be cured by exposure to ultraviolet light less than 400 nm in wavelength, and in some instances by light in the visible range as well. In the case of photocurable adhesives, the free radical source is termed a photoinitiator and results in the formation of free radicals on exposure to light. Compounds which act as photoinitiators with light in the range of 200–300 nm are benzoine ethers, activated benzophenones and related compounds; benzyl dialkyl amino morpholinyl ketone is an example of a visible wavelength-activated photoinitiator. Photoinitiators are disassociated into segments forming free radicals by light in a process known as scission. One example of an equal mix curing system is embodied in U.S. Pat. No. 4,331,795 which uses a cobalt salt accelerator in one component and a hydroperoxide in the other element. Epoxies may also be formulated that can be UV-cured via cationic polymerization by incorporating reactive diluents and cyclic monomers. UV-initiated cationic curing of urethanes may be accomplished, for instance, by basing the formation on vinyl ether and polyurethane oligomers such as that manufactured by Allied Signal Inc.

A great variety of embodiments of the invention may be practiced. The rate of photopolymerization may be controlled by adjusting the intensity of the light source. The spacer elements may be porous structures, and the prepolymer is then allowed to absorb into the porous matrix in order to provide better interpenetration of the polymer and spacing, thus providing better adhesion. The spacer elements may be composed of glass, typically in the form of beads or rods, which are then etched to increase the surface area for improved adhesion. One or more layers of a an adhesion promoter such as a silane coupling agent may be coated onto the glass spacers which may or may not have been etched, prior to the coating of the glass spacers with the prepolymer. The spacer elements may be admixed to the prepolymer in concentrations higher than what would be desired in regions of the display that are active image areas; the mixture is then deposited onto the substrate via printing or pipette methods into the interpixel regions or the perimeter where no image is presented, thus provided additional support without adversely affecting the image contrast or quality. The initiator may be solely heat activated or heat activated as well as photo-activated or other activation method. The polymer is chosen so as to contract following initial bonding to the substrates and upon curing; the two substrates are thus drawn together, increasing durability of the display; this is particularly effective when the polymer is localized around the spacer element, as has been previously described. The spacer element may be one or more sheets of an extensible porous membrane that when laminated in between the substrates is the element that determines the spacing between the substrates. One or more of the substrates may be of glass or other rigid material.

Other embodiments of the invention are within the following claims.

What is claimed is:

1. A method of manufacturing a display device containing a material with optical properties that are influenced by the field, comprising:

positioning electrodes to establish the field in the space between two substrates that face each other, at least one of the substrates being transparent;

introducing spacer elements between the two substrates, the spacer elements being generally randomly distributed between the substrates;

applying a liquid comprising a prepolymeric material to the exterior surfaces of the spacer elements before introduction of the spacer elements between the substrates, the liquid being in a liquid state upon introduction of the spacers into the space between the substrates;

prior to introducing the material with optical properties that are influenced by the field, polymerizing the prepolymexic material in situ to form solid polymeric material occupying at least a portion of the space between the substrates and providing a bond between the substrates, at least a portion of the solid polymeric material being in the vicinities of the spacer elements; and then filling at least a portion of the space between the two substrates with the material with optical properties that are influenced by the field.

2. The subject matter of claim 1 wherein the liquid comprising the prepolymeric material is encased in a collapsible shell surrounding at least some of the spacer elements.

3. The subject matter of claim 1 wherein a polymerization initiating or enhancing (PIE) material is brought into contact with the liquid prepolymeric material.

4. The subject matter of claim 3 wherein the PIE material is brought into contact with the prepolymeric material in one of the following ways: it is mixed with the liquid comprising the prepolymeric material applied to the spacer elements; it is carried on or within the spacer elements.

5. The subject matter of claim 4 wherein the liquid comprising the prepolymer material and the PIE material are both encased in a collapsible shell surrounding at least some of the spacer elements.

6. The subject matter of claim 3 wherein the PIE material comprises one or both of the following: an initiator and an accelerant of the in situ polymerization process.

7. The subject matter of claim 6 wherein the PIE material is light activated.

8. The subject matter of claim 7 wherein the PIE material comprises a photoinitiator.

9. The subject matter of claim 8 wherein the photoinitiator comprises a plurality of photoinitiators of different spectral sensitivities, so that polymerization may be initiated at different times in different locations.

10. The subject matter of claim 7 wherein the light is ultraviolet light.

11. The subject matter of claim 6 wherein the PIE material is heat activated.

12. The subject matter of claim 6 wherein the PIE material is self activated after a period of time following assembly of the display.

13. The subject matter of claim 3 wherein the polymerization in-situ comprises initiating polymerization by application of light.

14. The subject matter of claim 1 wherein the liquid prepolymeric material is a thermoset material, and the polymerizing in situ comprises the application of heat.

15. The subject matter of claim 1 wherein the polymeric material comprises polymer supports that extend between the two substrates.

16. The subject matter of claim 15 wherein the majority of the polymer supports are bonded to each of the two substrates.

17. The subject matter of claim 15 wherein the polymer supports are primarily separate members not interconnected with one another.

18. The subject matter of claim 15 wherein one or more interconnecting regions of polymer interconnects a majority of the polymer supports.

19. The subject matter of claim 18 wherein one of the interconnecting regions comprises a layer of polymer adjacent one of the substrates.

20. The subject matter of claim 1 wherein to polymeric material comprises polymer members that do not extend between the two substrates.

21. The subject matter of claim 1 wherein additional spacer elements without prepolymeric material are introduced between the substrates.

22. The subject matter of claim 1 wherein the spacer elements comprise a large number of generally spherical or cylindrical elements.

23. The subject matter of claim 22 wherein the spacer elements comprise glass.

24. The subject matter of claim 23 wherein the glass is etched.

25. The subject matter of claim 22 wherein the spacer elements comprise plastic.

26. The subject matter of claim 25 wherein the plastic is porous.

27. The subject matter of claim 26 wherein the spacer elements comprise high-surface area particles that are nanoporous, mesoporous, or microporous.

28. The subject matter of claim 25 wherein the spacer elements comprise PSEs.

29. The subject matter of claim 22 wherein the spacer elements are randomly located in the space between the substrates.

30. The subject matter of claim 1 wherein the spacer elements comprise a large number of elements generally of smaller diameter than the space between the substrates.

31. The subject matter of claim 30 wherein the spacer elements comprise a large number of elements randomly positioned across the space between the substrates.

32. The subject matter of claim 30 wherein the spacer elements are generally not in contact with the substrates.

33. The subject matter of claim 30 wherein the spacer elements are in contact with only one substrate.

34. The subject matter of claim 1 wherein the spacer elements comprise a lattice network structure.

35. The subject matter of claim 34 wherein the lattice network structure is two-dimensional.

36. The subject matter of claim 34 wherein the lattice network structure is three-dimensional.

37. The subject matter of claim 1 wherein the spacer elements are non-uniform in size and shape.

38. The subject matter of claim 1 wherein the spacer elements have a rough surface.

39. The subject matter of claim 1 wherein most of the spacer elements are free to move around in the space between the substrates prior to polymerization.

40. The subject mater of claim 1 wherein a porous membrane serves as a spacer element.

41. The subject matter of claim 40 wherein the porous membrane is an extensible porous membrane.

42. The subject matter of claim 1 wherein the spacer elements are located in non-image areas of the substrate.

43. The subject matter of claim 42 wherein the spacer elements are located along the peripheries of the substrates and serve as one or more sealing members sealing the space between the substrates.

44. The subject matter of claim 42 wherein the spacer elements are located at interpixel regions.

45. The subject matter of claim 1 wherein the prepolymer contracts upon in situ polymerization.

46. The subject matter of claim 1 wherein the spacer elements are wet sprayed on to the substrate.

47. The subject matter of claim 6 wherein a solvent used for wet spraying comprises the prepolymeric material in solution or suspension.

48. The subject matter of claim 1 wherein the PIE material comprises both a photoinitiator and an accelerant.

49. The subject matter of claim 1 wherein the spacer elements are porous structures wit a porous matrix, and the prepolymeric material is absorbed into the porous matrix of the porous structures.

50. The subject matter of claim 49 wherein the porous structures are nanoporous ceramic or silica based materials.

51. The subject matter of claim 1 wherein the spacer elements comprise an open network of polymer spheroids formed so that the material with optical properties that are influenced by the field fills inter-polymer regions.

52. The subject matter of claim 1 wherein the electro optic material is a liquid crystal material.

53. The subject matter of claim 1 wherein the electrooptic material is a mesomorphic material.

54. The subject matter of claim 1 wherein the prepolymeric material comprises at least one of the following: acrylic-based adhesive, epoxy-based adhesive, urethane-based adhesive.

55. The subject matter of claim 1 wherein the prepolymeric material primarily cured by application by one of the following: light heat, intermixing of a chemical additive.

56. The subject matter of claim 1 wherein the substrates comprise a flexible polymer material.

57. The subject matter of claim 56 wherein the display is capable of withstanding the flexing text referenced in the detailed description.

58. The subject matter of claim 1 wherein the prepolymeric material is a liquid when applied to the spacer elements.

59. The subject matter of claim 58 wherein the liquid prepolymeric material comprises one or more of the following: monomer, oligomer, inhibitor, adhesion promoter, polymerization initiating or enhancing (PIE) material.

60. The subject matter of claim 58 wherein the liquid prepolymeric material has a viscosity equal to or less than 2,000,000 centipoise.

61. The subject matter of claim 49 wherein the porosity of the porous structure is selected to yield a desired adhesion of the spacer element to a polymer matrix comprising the in situ polymerized material.

62. The subject matter of claim 1 further comprising at least one electrode on the second substrate.

63. The subject matter of claim 1 wherein the liquid comprising the prepolymeric material has a viscosity and composition suited for adhering to the surfaces of the spacer elements as the spacer elements are spray deposited on a substrate.

64. The subject matter of claim 1 wherein the spacer elements to which the liquid comprising prepolymeric material is applied are made from a material other than polymer and there are additional polymer spacer elements.

65. The subject matter of claim 58 wherein the liquid prepolymeric material is dissolved in a solvent when applied to the spacer elements.

66. The subject matter of claim 64 wherein the liquid comprising prepolymeric material is also applied to the polymer spacer elements.

67. The subject matter of claim 1 wherein the spacer elements comprise a core with at least one coating, and the liquid comprising the prepolymeric material is applied over the coating.

68. The subject matter of claim 67 wherein the coating comprises a material selected to improve the bond between the spacers and the liquid comprising the prepolymeric material or between the spacers and polymeric material.

69. The subject matter of claim 1 wherein the material with optical properties that are influenced by the field is an electrooptic material.

70. The subject matter of claim 1 wherein the material with optical properties that are influenced by the field is an electrooptic material.

71. The subject matter of claim 1 wherein the spacer elements comprise a large number of elements generally of the same or smaller diameter than the space between the substrates.

72. The subject matter of claim 71 wherein the spacer elements are coated individually with the liquid comprising the prepolymeric material prior to introduction of the spacer elements between the substrates.

73. The subject matter of claim 72 wherein the spacer elements are wet sprayed with the liquid coating on to at least one of the substrates.

74. The subject matter of claim 73 wherein the electrodes are positioned on both substrates.

75. The subject matter of claim 1 wherein the spacer elements comprise a large number of elements generally of the same or smaller diameter than the space between the substrates, and the spacer elements are wet sprayed on to one of the substrates along with the liquid comprising the prepolymeric material.

76. The subject matter of claim 1 wherein the electrodes are configured to establish an electric field in the space between the substrates.

77. The subject matter of claim 1 wherein the electrodes are configured to establish a magnetic field in the space between the substrates.

78. The subject matter of claim 1 wherein the liquid comprising the prepolymeric material is introduced into the space between the substrates in a liquid state at a temperature below 120 degrees C.

* * * * *

UNITED STATES PATENT AND TRADEMARK OFFICE
CERTIFICATE OF CORRECTION

PATENT NO. : 6,621,548 B2
DATED : September 16, 2003
INVENTOR(S) : Gary A. Freeman It is certified that error appears in the above-identified patent and that said Letters Patent is hereby corrected as shown below:

Column 1,
Line 66, before "high", insert -- have --.

Column 5,
Lines 6 and 32, "comprises", should be -- comprise --.
Lines 15 and 19, after "may", insert -- be --.

Column 7,
Line 24, "5." should be -- 7. --.
Line 37, "6." should be -- 8. --.
Line 41, "7." should be -- 9. --.
Line 56, "8." should be -- 10. --.
Line 63, "9." should be -- 11. --.
Line 66, "8." should be -- 12 --.

Column 8,
Lines 31-33, after "heat", delete "the substrate, the prepolymer/spacer mix is deposited as before. Alternatively, the PSEs may be".
Line 34-36, after "onto", delete "mixed with the prepolymer/spacer mix prior to its deposition onto", and after "substrat", insert -- the prepolymer/spacer mix is deposited as before. Alternatively, the PSEs may be mixed with the prepolymer/spacer mix prior to its deposition on the substrate --.

Column 9,
Line 50, "ferroelectric" should be -- ferroelectric --.

Column 12,
Line 17, "provided" should be -- providing --.

Column 13,
Line 48, "to" should be -- the --.

UNITED STATES PATENT AND TRADEMARK OFFICE
CERTIFICATE OF CORRECTION

PATENT NO.    : 6,621,548 B2
DATED         : September 16, 2003
INVENTOR(S)   : Gary A. Freeman It is certified that error appears in the above-identified patent and that said Letters Patent is hereby corrected as shown below:

Column 14,
Line 51, "wit" should be -- with --.
Line 60, "electro optic" should be -- electrooptic --.

Signed and Sealed this

Twenty-fourth Day of August, 2004

JON W. DUDAS
*Director of the United States Patent and Trademark Office*